United States Patent [19]

Plummer, Jr.

[11] 4,448,332
[45] May 15, 1984

[54] VIBRATORY STORAGE PILE DISCHARGER MEANS

[75] Inventor: Virgil C. Plummer, Jr., Louisville, Ky.

[73] Assignee: Vibranetics, Inc., Louisville, Ky.

[21] Appl. No.: 270,117

[22] Filed: Jun. 3, 1981

[51] Int. Cl.³ ............................................. B65G 65/40
[52] U.S. Cl. ................................... 222/196; 222/409
[58] Field of Search ............... 222/196, 201, 226, 236, 222/238, 239, 240, 242

[56] References Cited

U.S. PATENT DOCUMENTS 2,057,768  10/1936  DeMotte ........................... 222/242
4,285,447   8/1981  Fairbank ........................... 222/200

OTHER PUBLICATIONS

Vibranetics, Inc., "Vibrating Storage Pile Discharger", Bulletin 105A.

Primary Examiner—Joseph J. Rolla
Assistant Examiner—Charles C. Compton
Attorney, Agent, or Firm—Harry B. O'Donnell, III

[57] ABSTRACT

This invention provides an improved vibratory storage pile discharger unit for promoting the downward flow of material from a storage pile of a flowable material, such as coal, limestone, woodchips, sulphur and the like, through an opening in a generally horizontal surface on which the pile is supported and into another area located beneath that pile-supporting surface.

8 Claims, 5 Drawing Figures

VIBRATORY STORAGE PILE DISCHARGER MEANS

BACKGROUND OF THE INVENTION

This invention relates to material storage means and, more particularly, to improved vibratory storage pile discharger means for promoting the downward flow of material from a storage pile of a flowable material, such as coal, limestone, woodchips, sulphur and the like, through an opening in a generally horizontal surface on which the pile is supported and into another area located beneath that pile-supporting surface.

Storage piles exist because they represent an economical arrangement for storage of large quantities of bulk solids. Some materials in storage piles flow without difficulty such as dry sand, gravel, etc., and yield large amounts of withdrawal without inducement. However, many materials such as limestone, coal, woodchips, sulphur, etc. need assistance in flowing from a storage pile.

In the past, various prior-art structures have been provided for promoting downward flow of these last-mentioned materials from a storage pile thereof through an opening in a generally horizontal surface on which the pile is supported. Perhaps the most successful thus far have been the vibratory storage pile discharger means shown and described in detail in Bulletin 105A published in March, 1980 by Vibranetics, Inc. of Louisville, Ky.

The present invention is concerned with providing vibratory storage pile discharger means which are improved over the just-noted prior-art structures in economy and simplicity of construction and in performance of desired function.

SUMMARY OF THE INVENTION

The present invention provides improved vibratory storage pile discharger means for promoting the downward flow of material from a storage pile of a flowable material, such as coal, limestone, woodchips, sulphur and the like, through an opening in a generally horizontal surface on which the pile is supported and into another area located beneath that pile-supporting surface.

Basically, the improved vibratory storage pile discharger means provided by the present invention comprises: (a) an inverted hollow frustoconical conduit member generally vertically arranged within the opening in the pile-supporting surface with its long central axis concentrically aligned with that of the opening and having its wider upper inlet end supported by the pile-supporting surface through resilient means and also having its narrower lower outlet end extending through the opening and into an area located therebeneath; (b) an upright conical member mounted generally vertically within the wider upper inlet end of the hollow frustoconical conduit member with its base being radially spaced apart from the interior walls thereof and having its long central axis concentrically aligned with those of the opening in the pile-supporting surface and the inverted hollow frustoconical conduit member and also having its apex standing above the uppermost edge of the inverted hollow frustonconical conduit member; and (c) drive means connected to the inverted hollow frustoconical conduit member for imparting vibratory movement to it and the upright conical member mounted therein with respect to the pile-supporting surface and the opening therethrough to transmit vibratory impulses to the pile and thus promote downward flow of material from the pile through said conduit member and into the area located beneath the pile-supporting surface.

Preferably, the upright conical member has its upper conical surface disposed outwardly and downwardly from its apex at an angle of not greater than 30° with respect to the concentrically aligned long central axes of that conical member and the inverted hollow frustoconical conduit member and has attached to it a plurality of circumferentially spaced apart ribs which project outwardly and downwardly.

And, it is also desirable that the uppermost edge of the inverted hollow frustoconical conduit member be absent of an upright frustoconical drawdown skirt around its periphery.

BRIEF DESCRIPTION OF THE DRAWINGS

The present invention is illustrated in the accompanying drawings, wherein.

DETAILED DESCRIPTION

Figure 1:
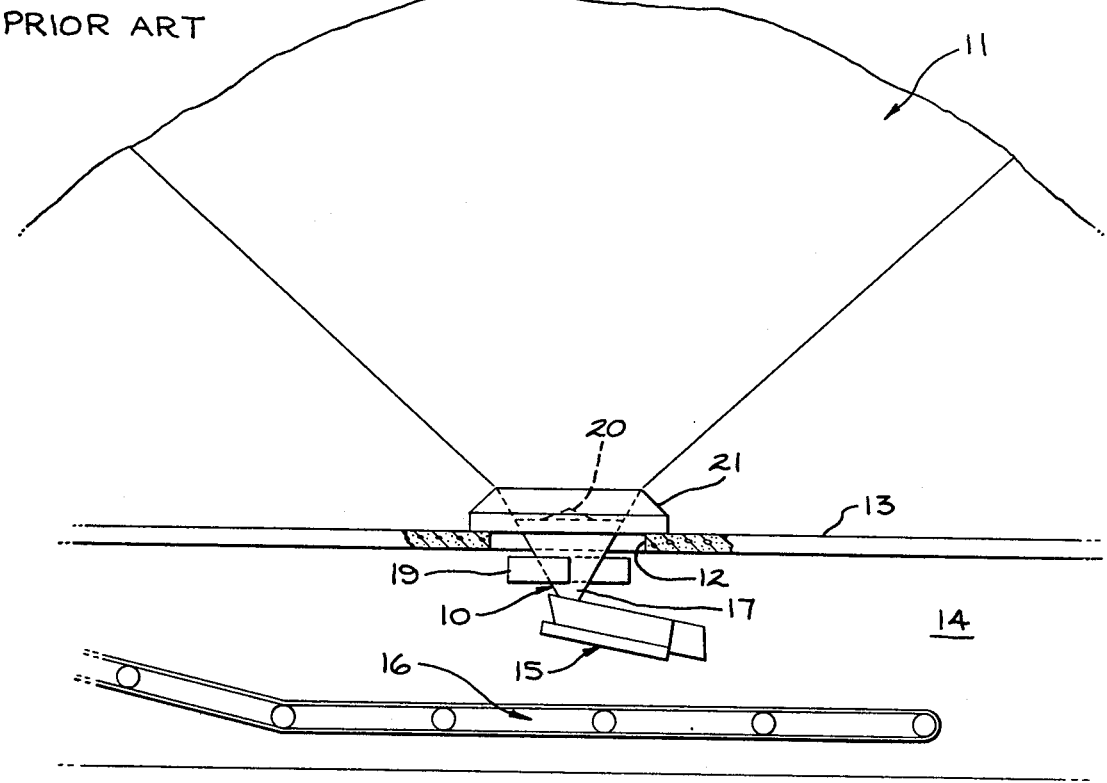
FIG. 1 is a somewhat schematic elevational view, partly in cross-section, illustrating employment of a prior-art vibratory storage pile discharger means of the type shown and described in the aforenoted Vibranetics Bulletin 105A.

Turning now to the drawings, it can be seen that the structure of the prior-art vibratory storage pile discharger means 10, shown in FIG. 1, and the improved vibratory storage pile discharger means 110, which are provided in accordance with the present invention and are illustrated in FIGS. 2-5, are somewhat similar.

Figure 2:
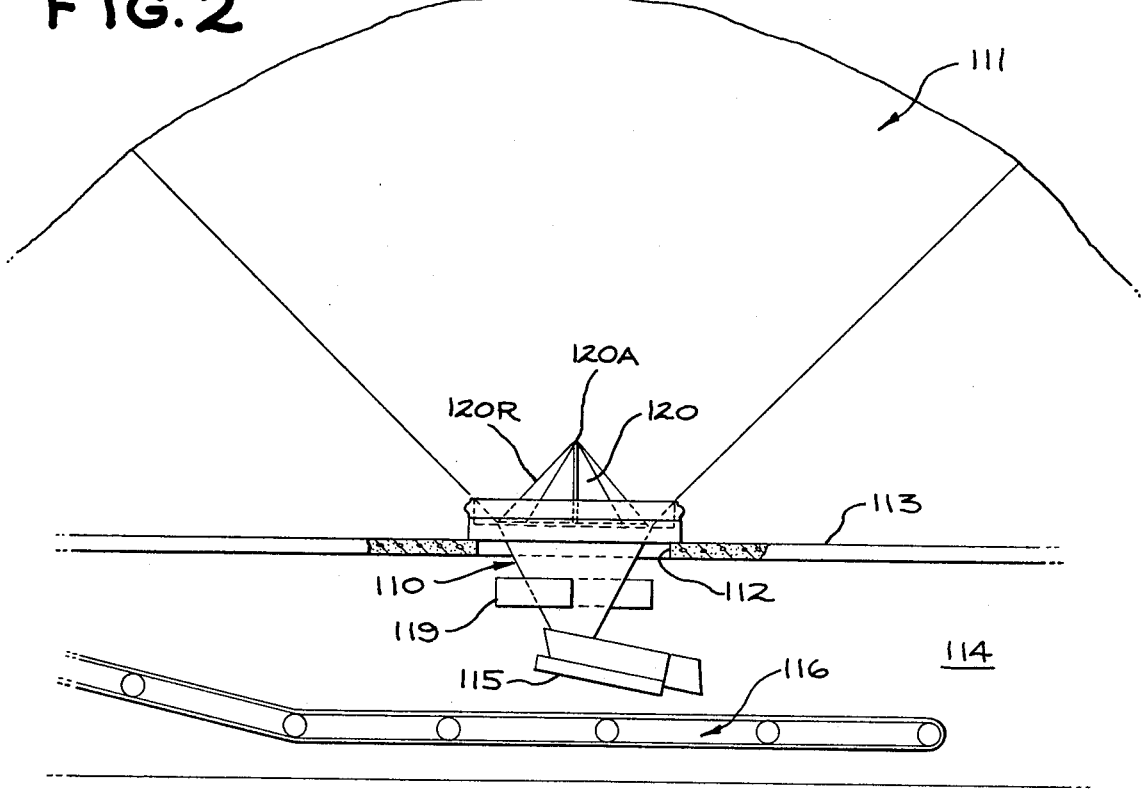
FIG. 2 is a view similar to FIG. 1, but showing, instead, employment of a presently preferred embodiment of the improved vibratory storage pile discharger means that are provided in accordance with the present invention.

As best shown in FIGS. 1 and 2, both the prior-art discharger means 10 and the improved discharger means 110 can be employed to promote the downward flow of material from a storage pile of material 11 of 111, such as coal, limestone, woodchips, sulphur and the like, through an opening 12 or 112 in a generally horzontal surface 13 or 113, such as the illustrated concrete pad, on which the pile 11 or 111 is supported, and into another area, such as the illustrated tunnel 14 or 114 located beneath the pile-supporting surface 13 or 113, in which there can be located supplemental conveying equipment, such as the illustrated vibratory feeder 15 or 115 and belt conveyor 16 or 116.

Figure 3:
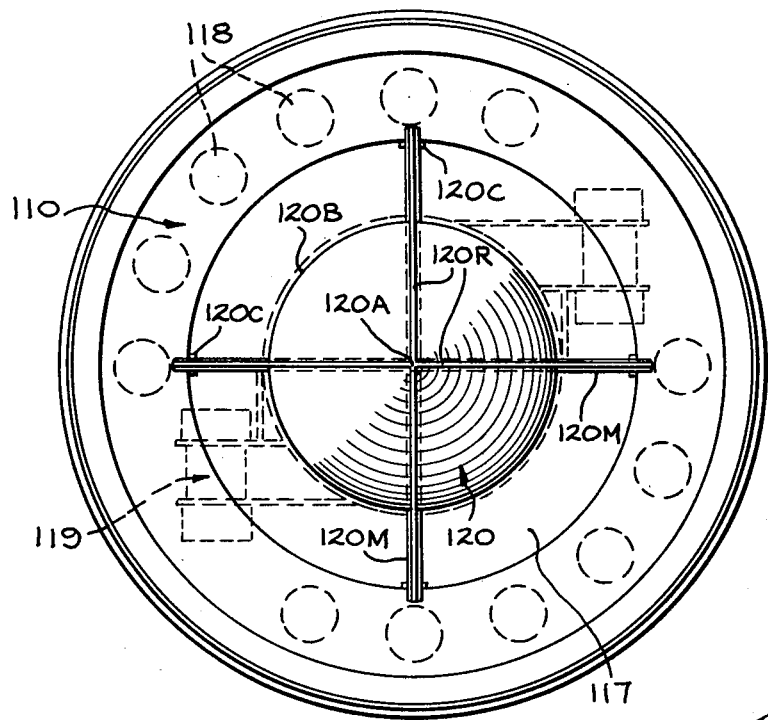
FIG. 3 is a somewhat enlarged top plan view of the improved vibratory storage pile discharger means shown in FIG. 2.
Figure 4:
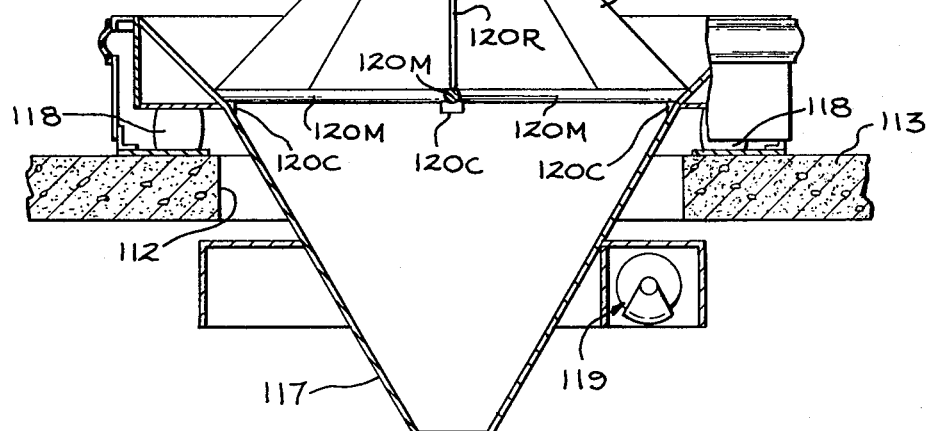
FIG. 4 is an elevational view, partly in cross-section, of the improved vibratory storage pile discharger means shown in FIG. 3.

As also shown in the drawings, the prior-art discharger means 10 and the improved discharger means 110 of the present invention are additionally structurally similar in that both include an inverted hollow frustoconical conduit member 17 or 117 that is generally vertically arranged within the opening 12 or 112 in the pile-supporting surface 13 or 113 with its long central axis concentrically aligned with that of the opening 12 or 112 and having its wider upper inlet end supported by the pile-supporting surface 13 or 113 through resilient means, such as the air bags 118 shown in FIGS. 3 and 4, and also having its narrower lower outlet end extending through the opening 12 or 112 and into the area 14 or 114 located therebeneath.

And, as still further shown in the drawings, the prior-art discharger means 10 and the improved discharger means 110 of the present invention both can employ similar drive means 19 or 119, such as are described in detail in U.S. Pat. No. 3,785,529, that are connected in a well-known manner to the inverted hollow frustoconical conduit member17 or 117 for imparting vibratory movement to the same with respect to the pile-supporting surface 13 or 113 and the opening 12 or 112 therethrough.

However, as further indicated by the drawings, several important and advantageous structural differences do exist between the prior-art discharger means 10 and the improved discharger means 110 that is provided in accordance with the present invention. These structural differences include, among other things, the novel construction of an upright conical member 120 (FIG. 5) that is mounted generally vertically within the wider upper inlet end of the hollow frustoconical conduit member 117 of the improved discharger means 110 with its base 120B being radially spaced apart from the interior walls thereof (FIG. 3) and having its long central axis concentrically aligned with those of the opening 112 in the pile-supporting surface 113 and the inverted hollow frustoconical conduit member 117 and also having its apex 120A extending above the uppermost edge of the inverted hollow frustoconical conduit member 117 (FIGS. 2 and 4) and which is substituted for the conventional shallow pressure cone 20 as found in the prior-art discharger means 10 (FIG. 1).

Figure 5:
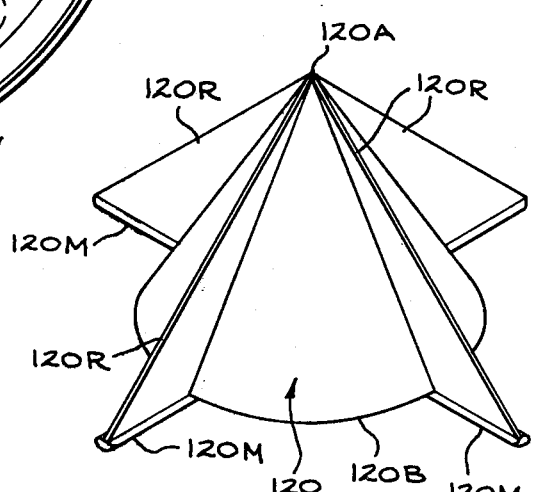
FIG. 5 is an elevational perspective view of the novel upright conical member of the improved vibratory storage pile discharger means shown in FIGS. 2-4.

As best shown in FIGS. 2, 4 and 5, the novel upright conical member 120 has its upper conical surface disposed outwardly and downwardly from its apex 120A at an angle of not greater then 30° with respect to the concentrically aligned long central axes of that conical member 120 and the inverted hollow frustoconical conduit member 117 and has attached to it a plurality of circumferentially spaced apart ribs 120R which project outwardly and downwardly from its apex 120A to its base 120B. As illustrated, four such ribs 120R are provided and are circumferentially spaced apart by 90° angles, with their lower ends being affixed to a pair of crossed-mounting rods 120M, the outermost ends of which are seated in complementary mounting brackets 120C that are provided on the interior of the wall of the wider upper inlet end of the inverted hollow frustoconical conduit member 117 of the improved discharger means 110 of the present invention (FIGS. 2 and 5).

Employment of the just-described novel upright conical member 120 in the inverted hollow frustoconical member 117 permits the uppermost edge of said conduit member 117 to be absent of an upright frustoconical drawdown skirt around its periphery, such as the conventional drawdown skirt 21 that is illustrated in FIG. 1 as being installed around the uppermost edge of the similar conduit member 17 of the prior-art discharger means 10.

From the foregoing, it should be amply clear that energization of the drive means 119 will cause simultaneous vibratory movement of the inverted hollow frustoconical conduit member 117 and the novel upright conical member 120 mounted therein with respect to the pile-supporting surface 113 and the opening 112 therethrough to thus transmit vibratory impulses to the storage pile 111 via said novel conical member 120 and thus promote downward flow of material from the pile 111 through the conduit member 117 and into the area 114 located beneath the pile-supporting surface 113 (FIG. 2).

It should be apparent that while there has been described what is presently considered to be a presently preferred form of the present invention in accordance with the Patent Statutes, changes may be made in the disclosed apparatus without departing from the true spirit and scope of this invention. It is, therefore, intended that the appended claims shall cover such modifications and applications that may not depart from the true spirit and scope of the present invention.

What is claimed is:

1. Improved vibratory storage pile discharger means for promoting the downward flow of material from a storage pile of a flowable material, such as coal, limestone, woodchips, sulphur and the like, through an opening in a generally horizontal surface on which the pile is supported and into another area located beneath that pile-supporting surface, comprising:
   (a) an inverted hollow frustoconical conduit member generally vertically arranged within the opening in the pile-supporting surface with its long central axis concentrically aligned with that of the opening and having its wider upper inlet end supported by the pile-supporting surface through resilient means and also having its narrower lower outlet end extending through the opening and into an area located therebeneath;
   (b) an upright conical member mounted generally vertically within the wider upper inlet end of said hollow frustoconical conduit member with its base being radially spaced apart from the interior walls thereof and having its long central axis concentrically aligned with those of the opening in the pile-supporting surface and said inverted hollow frustoconical conduit member and also having its apex extending above the uppermost edge of said inverted hollow frustoconical conduit member; and
   (c) drive means connected to said inverted hollow frustoconical conduit member for imparting vibratory movement to it and the upright conical member mounted therein with respect to the pile-supporting surface and the opening therethrough to transmit vibratory impulses to the pile and thus promote downward flow of material from the pile through said conduit member and into the area located beneath the pile-supporting surface.

2. The invention of claim 1, wherein said upright conical member has its upper conical surface disposed outwardly and downwardly from its apex at an angle of not greater than 30° with respect to said concentrically aligned long central axes of said conical member and said inverted hollow frustoconical conduit member.

3. The invention of claim 2, wherein said upper surface of said upright conical member has attached to it a plurality of circumferentially spaced apart ribs which project outwardly and downwardly therefrom.

4. The invention of claim 3, wherein said uppermost edge of said inverted hollow frustoconical conduit member is absent of an upright frustoconical drawdown skirt around its periphery.

5. The invention of claim 1, wherein said upright conical member has its upper conical surface disposed outwardly and downwardly from its apex with respect to said concentrically aligned long central axes of said conical member and said inverted hollow frustoconical member and said upper surface of said upright conical member has attached to it a plurality of circumferentially spaced apart ribs which project outwardly and downwardly therefrom.

6. The invention of claim 5, wherein said uppermost edge of said inverted hollow frustoconical conduit member is absent of an upright frustoconical drawdown skirt around its periphery.

7. The invention of claim 1, wherein said uppermost edge of said inverted hollow frustoconical conduit member is absent of an upright frustoconical drawdown skirt around its periphery.

8. The invention of claim 2, wherein said uppermost edge of said inverted hollow frustoconical conduit member is absent of an upright frustoconical drawdown skirt around its periphery.

* * * * *